United States Patent
Cai et al.

(10) Patent No.: US 10,845,591 B2
(45) Date of Patent: Nov. 24, 2020

(54) SPLIT EXIT PUPIL HEADS-UP DISPLAY SYSTEMS AND METHODS

(71) Applicant: Ostendo Technologies, Inc., Carlsbad, CA (US)

(72) Inventors: Jingbo Cai, Carlsbad, CA (US); Hussein S. El-Ghoroury, Carlsbad, CA (US); Chih-Li Chuang, San Diego, CA (US); Marty Maiers, Fallbrook, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/786,380

(22) Filed: Oct. 17, 2017

(65) Prior Publication Data

US 2018/0039078 A1 Feb. 8, 2018

Related U.S. Application Data

(63) Continuation of application No. PCT/US2017/026013, filed on Apr. 4, 2017, which is a continuation-in-part of application No. 15/449,707, filed on Mar. 3, 2017, now abandoned.

(Continued)

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *G02B 5/10* (2013.01);
(Continued)

(58) Field of Classification Search
CPC .... G02B 27/0101; G02B 13/18; G02B 27/30; G02B 5/10; G02B 2027/0123;
(Continued)

(56) References Cited

U.S. PATENT DOCUMENTS

| 4,218,111 A | 8/1980 | Withrington et al. |
| 4,613,200 A | 9/1986 | Hartman |

(Continued)

FOREIGN PATENT DOCUMENTS

| CN | 101334530 | 1/2011 |
| DE | 102012205164 | 10/2013 |

(Continued)

OTHER PUBLICATIONS

"International Search Report and Written Opinion of the International Searching Authority dated Aug. 25, 2017; International Application No. PCT/US2017/026013", Aug. 25, 2017.

(Continued)

*Primary Examiner* — Alicia M Harrington
(74) *Attorney, Agent, or Firm* — W. Eric Boyd, Esq.

(57) ABSTRACT

A split exit pupil heads-up display (HUD) system and method. The HUD system architecture makes use of a split exit pupil design method that enables a modular HUD system and allows the HUD system viewing eye-box size to be tailored while reducing the overall volumetric aspects. A single HUD module utilizes a micro-pixel imager to generate a HUD virtual image with a given viewing eye-box size. When integrated together into a single HUD system, a multiplicity of such HUD modules displaying the same image enables an integrated HUD system to have an eye-box size that equals the same multiple of the eye-box size of a single HUD module. The brightness of the integrated HUD system is maintained while the eye-box size becomes multiple size of the eye-box of a single module. The integrated HUD system can be comprised of multiplicity of single HUD modules to scale the eye-box size to match the intended application while maintaining system brightness.

15 Claims, 9 Drawing Sheets

Related U.S. Application Data

(60) Provisional application No. 62/321,650, filed on Apr. 12, 2016.

(51) Int. Cl.
  *G02B 13/18* (2006.01)
  *G02B 27/30* (2006.01)
  *G02B 5/10* (2006.01)
  *G06T 3/00* (2006.01)
  *B60K 35/00* (2006.01)

(52) U.S. Cl.
  CPC ............. *G02B 13/18* (2013.01); *G02B 27/30* (2013.01); *G06T 3/0093* (2013.01); *B60K 2370/155* (2019.05); *B60K 2370/1529* (2019.05); *B60K 2370/31* (2019.05); *B60K 2370/334* (2019.05); *B60K 2370/349* (2019.05); *B60K 2370/77* (2019.05); *G02B 2027/011* (2013.01); *G02B 2027/0123* (2013.01)

(58) Field of Classification Search
  CPC .............. G02B 2027/011; B60K 35/00; B60K 2350/2065; B60K 2350/921; B60K 2350/1072; B60K 2350/2052; B60K 2350/2069; G06T 3/0093
  See application file for complete search history.

(56) References Cited

U.S. PATENT DOCUMENTS

| | | | |
|---|---|---|---|
| 5,729,366 A | 3/1998 | Yang | |
| 6,014,259 A | 1/2000 | Wohlstadter | |
| 6,262,848 B1 * | 7/2001 | Anderson | G02B 27/0101 359/630 |
| 6,813,086 B2 | 11/2004 | Bignolles et al. | |
| 6,859,295 B2 | 2/2005 | Matsuoka | |
| 7,391,574 B2 | 6/2008 | Fredriksson | |
| 7,623,560 B2 | 11/2009 | El-Ghoroury et al. | |
| 7,767,479 B2 | 8/2010 | El-Ghoroury et al. | |
| 7,829,902 B2 | 11/2010 | El-Ghoroury et al. | |
| 7,982,959 B1 | 7/2011 | Lvovskiy et al. | |
| 8,049,231 B2 | 11/2011 | El-Ghoroury et al. | |
| 8,098,265 B2 | 1/2012 | El-Ghoroury et al. | |
| 8,243,770 B2 | 8/2012 | El-Ghoroury et al. | |
| 8,553,334 B2 | 10/2013 | Lambert et al. | |
| 8,567,960 B2 | 10/2013 | El-Ghoroury et al. | |
| 8,629,903 B2 | 1/2014 | Seder et al. | |
| 8,736,964 B2 | 5/2014 | Imahori et al. | |
| 9,135,754 B2 | 9/2015 | Ng-Thow-Hing et al. | |
| 9,494,794 B2 | 11/2016 | El-Ghoroury et al. | |
| 2002/0105581 A1 | 8/2002 | Masaki et al. | |
| 2004/0001054 A1 | 1/2004 | Nitta et al. | |
| 2006/0209419 A1 | 9/2006 | Dobschal et al. | |
| 2009/0086170 A1 | 4/2009 | El-Ghoroury et al. | |
| 2009/0278765 A1 | 11/2009 | Stringfellow | |
| 2009/0278998 A1 | 11/2009 | El-Ghoroury et al. | |
| 2010/0003777 A1 | 1/2010 | El-Ghoroury et al. | |
| 2010/0066921 A1 | 3/2010 | El-Ghoroury et al. | |
| 2010/0091050 A1 | 4/2010 | El-Ghoroury et al. | |
| 2010/0220042 A1 | 9/2010 | El-Ghoroury et al. | |
| 2012/0033113 A1 | 2/2012 | El-Ghoroury et al. | |
| 2012/0224060 A1 | 9/2012 | Gurevich et al. | |
| 2013/0016292 A1 | 1/2013 | Miao et al. | |
| 2013/0021226 A1 | 1/2013 | Bell | |
| 2013/0100524 A1 | 4/2013 | Magarill et al. | |
| 2013/0182197 A1 | 7/2013 | Ludewig et al. | |
| 2013/0258451 A1 | 10/2013 | El-Ghoroury et al. | |
| 2013/0321581 A1 | 12/2013 | El-Ghoroury et al. | |
| 2014/0055863 A1 | 2/2014 | Inoguchi | |
| 2014/0340297 A1 | 11/2014 | Oke et al. | |
| 2015/0077857 A1 | 3/2015 | Riebe | |
| 2015/0085259 A1 | 3/2015 | Schreiber et al. | |
| 2015/0103409 A1 | 4/2015 | Rossini | |
| 2015/0108782 A1 | 4/2015 | Chou et al. | |
| 2015/0130977 A1 | 5/2015 | Ladd | |
| 2016/0003636 A1 | 1/2016 | Ng-Thow-Hing et al. | |
| 2016/0062113 A1 | 3/2016 | El-Ghoroury et al. | |
| 2016/0065921 A1 | 3/2016 | Sieler et al. | |
| 2016/0085084 A1 | 3/2016 | Masson et al. | |
| 2018/0005409 A1 | 1/2018 | Aksoy et al. | |

FOREIGN PATENT DOCUMENTS

| | | |
|---|---|---|
| EP | 2515157 | 10/2012 |
| EP | 2565700 | 3/2013 |
| JP | 08-122737 | 5/1996 |
| WO | WO-2011/065738 | 6/2011 |
| WO | WO-2016/036738 | 3/2016 |

OTHER PUBLICATIONS

"Invitation to Pay Additional Fees dated Jun. 19, 2017; International Application No. PCT/US2017/026013", Jun. 19, 2017.

Born, Max et al., "Principles of Optics, 7th Edition", Cambridge University Press, 1999, pp. 236-244.

Guilloux, Cyril et al., "Varilux S series, breaking the limits", Jun. 2012, pp. 1-9.

Walker, Bruce H., "Optical Design for Visual Systems", Published by SPIE—The International Society for Optical Engineering, 2000, pp. 139-150.

* cited by examiner

SPLIT EXIT PUPIL HEADS-UP DISPLAY SYSTEMS AND METHODS

CROSS-REFERENCE TO RELATED APPLICATIONS

This application is a continuation of International Application No. PCT/US2017/026013 filed Apr. 4, 2017, which is a continuation-in-part of U.S. patent application Ser. No. 15/449,707 filed Mar. 3, 2017, which claims the benefit of U.S. Provisional Patent Application No. 62/321,650 filed Apr. 12, 2016.

BACKGROUND OF THE INVENTION

1. Field of the Invention

This invention relates generally to the field of microdisplay-based heads-up displays (HUD) for automobiles, boats and other craft with a windshield which reflects a displayed virtual image to a vehicle operator and, more particularly, to a compact HUD system comprising aberration correction features facilitating both its installation and alignment in a vehicle.

2. Prior Art

HUDs are increasing in popularity as a visual aide technology that contributes to automotive safety by making automobile drivers more visually aware and better informed of the automobile dashboard information without taking their sight and attention from the road. It is always desirable to reduce the volume and cost of a HUD system without trading away performance such as reduced image fidelity and brightness, field of view and eye-box size for wider HUD adoption by different types of vehicles.

Prior art HUD systems can be generally grouped into two major type: pupil imaging HUDs and non-pupil imaging HUDs. A pupil imaging HUD is typically comprised of a relay module, which is responsible for the intermediate image delivery and a collimation module, which is responsible for image collimation. The HUD pupil is also imaged at viewer's eye location (herein referred to as the eye-box). The etendue of the pupil imaging HUD is used to generate the desired field of view (FOV) and eye-box but its optical complexity is higher and volume larger due to the necessary additional pupil imaging function. The pupil imaging HUD is suitable for applications where physical volume constraints and cost are not overly restrictive and where optical performance is demanding. A non-pupil imaging HUD does not form a distinct eye-box in the plane containing the operators' eyes (herein referred to as the eye-plane). Specifically, every field point on the virtual image has a corresponding eye-box in the eye-plane but the position of the eye-box shifts in the eye-plane as the field point on the virtual image changes. The overlap of all these single-filled point eye-boxes in the eye-plane defines the monocular eye-box over which the entire virtual image can be observed with one eye. Traditionally, a monocular eye-box is defined as the eye-box for the non-pupil imaging HUD. Non-pupil imaging HUDs function in the same way as a magnifier with its aperture, FOV and eye-box being interrelated and depending on virtual image distance and eye distance. A non-pupil imaging HUD is more commonly adopted in commercial vehicle applications because of its low optical complexity. However, to meet the required eye-box size, a large HUD aperture is needed which leads to a long effective focal length (EFL) for the HUD to ensure sufficient image quality. A long EFL in turn dictates a need for a larger imager panel to meet the FOV requirement. Usually a LCD panel is used as an image source for the non-pupil HUD. Alternatively, a large projected intermediate image on a diffusive screen generated by a micro-display projection unit can be used. The use of a diffusive screen widens the light cone from the intermediate image to fill the non-pupil HUD aperture. These prior art HUD systems tend to be bulky and complicated due to the need for either a relay module or an intermediate image projection unit. A prior art pupil imaging HUD (U.S. Patent Application Publication No. 2013/0100524 A1) and a non-pupil imaging HUD (U.S. Patent Application Publication No. 2006/0209419 A1) are shown in FIG. 1-1 and FIG. 1-2 respectively.

The prior art described in U.S. Patent Application Publication No. 2013/0100524 A1, shown in FIG. 1-1, is a pupil-imaging HUD system based on a microdisplay. The HUD system requires complicated relay optics (see numeral 50 in FIG. 1-1) to compensate for aberration and to deliver the intermediate image. Numeral 20 of FIG. 1-1 is an anamorphic aspheric combiner. In addition, this type of HUD system includes a projection system (numeral 80 in FIG. 1-1) to project a magnified microdisplay image onto a diffuser screen (numeral 70 in FIG. 1-1). The microdisplay may be of DLP-type, LCoS-type or transmissive LCD-type. This type of HUD is not well-suited for automobile applications, in part, because of the required use of a combiner.

The prior art described in U.S. Patent Application Publication No. 2006/0209419 A1, shown in FIG. 1-2, is a non-pupil imaging HUD which uses either a large LCD display panel or a diffusive image screen (numeral 3 in FIG. 1-2). Numeral 4 is the windshield. The lens (numeral 2 in FIG. 1-2) has a free-form surface facing the concave mirror (numeral 7 in FIG. 1-2). The free-form surface is designed to correct aberration and is cost-intensive to fabricate.

The prior art described in U.S. Patent Application Publication No. 2015/0077857 A1, shown in FIG. 1-3, discloses the use of mono-ocular vision to expand the virtual image horizontal width without increasing the HUD horizontal aperture. In FIG. 1-3, numeral 200 represents the whole virtual image which is divided into three zones (numeral 210, 220 and 230 of FIG. 1-3). Numeral 300 denotes the eye-box which is divided into a left zone (numeral 310 of FIG. 1-3) and a right zone (numeral 320 of FIG. 1-3). Numeral 210 is visible to both eye-box zones while numeral 220 is visible only to eye-box zone 310 and numeral 230 only to eye-box zone 320. The mono-ocular image zones 220 and 230 are generated by expanded display panel zones 113 and 112. The HUD size is mainly controlled by the bi-ocular image zone width and eye-box size. Numeral 130 in FIG. 1-3 is the windshield.

The prior art described in U.S. Patent Application Publication No. 2015/0103409 A1, shown in FIG. 1-4, uses a group of sub-systems (numeral 26 in FIG. 1-4) to achieve a more compact HUD system. Each sub-system has an associated display pane (numeral 24 in FIG. 1-4) which is dimensioned and positioned relative to the sub-system axis in a certain way to achieve a desired a-eye-box size. The image to be displayed is distributed over the group of display panels. Also the disclosed method is based on an infinitely distant virtual image which does not cover modern vehicle HUD systems with the requirement of having the virtual image at two to three meters from the car operator. Further, the focal length of the sub-systems is also scaled based on the sub-system distance to the central axis of the composite system. Hence the sub-systems in U.S. Patent Application Publication No. 2015/0103409 A1 are not identical but depend on distance from the main axis, thus making the prior art HUD system not modular.

In a previous disclosure U.S. Pat. No. 9,494,794, a heads-up display method is disclosed that uses a multiplicity of emissive micro-scale pixel array imagers to realize a HUD system that is substantially smaller in volume than a conventional HUD system that uses a single image forming source and a single mirror. The aforementioned disclosure discloses a novel split exit pupil HUD system design method that utilizes a multiplicity of emissive micro-scale pixel array imagers to enable the realization of a modular HUD system with volumetric and cost aspects that can be scaled to match a wide range of automobile and small vehicles sizes and price ranges. It is the objective of the present invention to extend the design methods of U.S. Pat. No. 9,494,794 to include a method for forming a virtual image at a finite distance from the automobile windshield and methods for the pre-compensation of aberrations generated by the windshield, and system installation and alignment. Additional objectives and advantages of this invention will become apparent from the following detailed description of a preferred embodiment thereof that proceeds with reference to the accompanying drawings.

With regard to the reference numbers shown in FIGS. 1-1, 1-2, 1-3 and 1-4 which are not described in the specification, those reference numbers are discussed in their respective publications.

BRIEF DESCRIPTION OF THE DRAWINGS

In the following description, like drawing reference numerals are used for the like elements, even in different drawings. The matters defined in the description, such as detailed construction and design elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of which will now be described, by way of non-limiting examples only, with reference to accompanying drawings, in which:

FIG. 1-2 Illustrates a further prior art Heads-up Display (HUD) system.

FIG. 1-3 Illustrates a yet further prior art Heads-up Display (HUD) system.

FIG. 1-4 Illustrates a yet further prior art Heads-up Display (HUD) system.

FIGS. 2-1 and 2-2 Illustrate the modular HUD (MHUD) system of this invention.

FIG. 3 Illustrates relationships among selected design parameters and constraints of the MHUD system of this invention.

FIG. 4 Illustrates selected optical design aspects and a ray trace diagram of a single HUD module comprising the MHUD assembly of this invention.

DETAILED DESCRIPTION OF THE PREFERRED EMBODIMENTS

Figure 1:
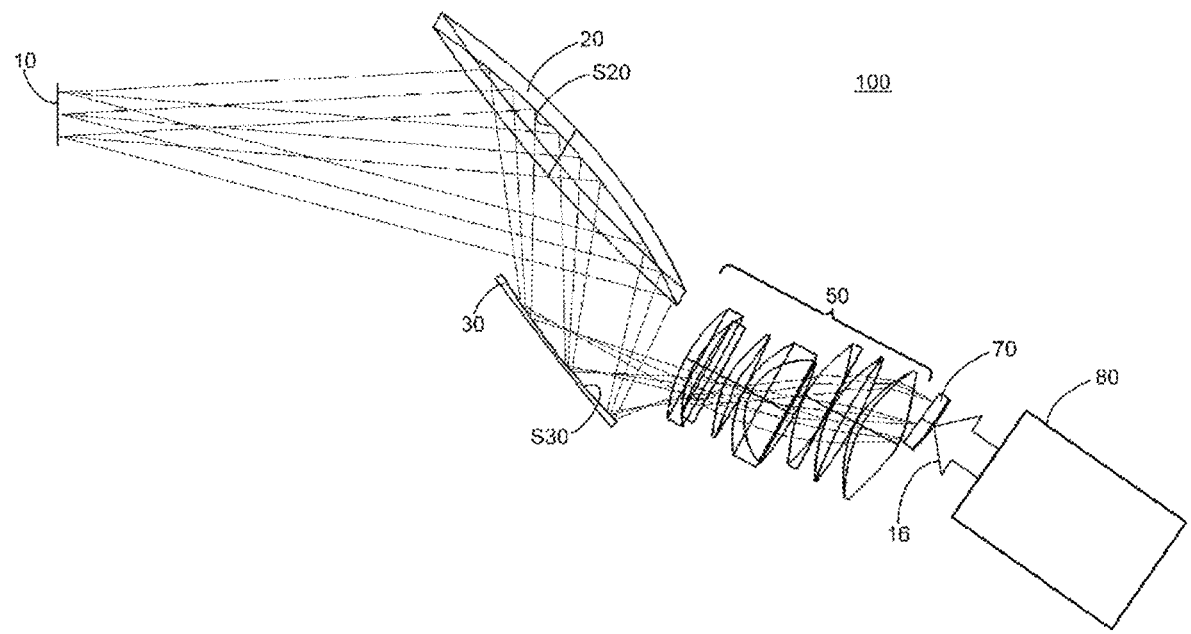
FIG. 1-1 Illustrates a prior art Heads-up Display (HUD) system.

References in the following detailed description of the present invention to "one embodiment" or "an embodiment" mean that a particular feature, structure, or characteristic described in connection with the embodiment is included in at least one embodiment of the invention. The appearance of the phrase "in one embodiment" in various places in this detailed description is not necessarily referring to the same embodiment.

A new class of emissive micro-scale pixel array imager devices has been recently introduced. These devices feature high brightness, very fast multi-color light intensity and spatial modulation capabilities in a very small single device size that includes necessary image processing drive circuitry. The solid state light (SSL) emitting pixels of one such a device may be either a light emitting diode (LED) or laser diode (LD) whose on-off state is controlled by the drive circuitry contained within a CMOS chip (or device) upon which the emissive micro-scale pixel array of the imager is bonded. The size of the pixels comprising the emissive array of such imager devices may be in the range of approximately 5-20 microns with an emissive surface area of the device being in the range of approximately 15-150 square millimeters. The pixels within the emissive micro-scale pixel array device are individually addressable spatially, chromatically and temporally, typically through the drive circuitry of its CMOS chip. The brightness of the light generated by such imager devices can reach multiples of 100,000 cd/m2 at reasonably low power consumption. One example are the QPI devices (see U.S. Pat. Nos. 7,623,560, 7,767,479, 7,829,902, 8,049,231, 8,243,770 and 8,567,960), referred to in the exemplary embodiments described below. However it is to be understood that the aforementioned QPI device is merely an example of the types of devices that may be used in the present invention. Thus in the description to follow, references to a QPI device or simply "imager" are to be understood to be for purposes of specificity in the embodiments disclosed, and not for any limitation of the present invention.

The present invention combines the emissive micro pixel array device-unique capabilities of the QPI device with a novel split exit pupil HUD system architecture in order to realize a low-cost and small volume modular HUD (MHUD) system that can be used in applications where the cost and volumetric constraints are paramount, such as an automotive HUD. The combination of the above emissive high brightness micro emitter pixel array of the QPI and the split exit pupil HUD architecture of this invention enables HUD systems that are sufficiently bright to operate effectively in high brightness ambient sunlight yet are volumetrically small enough to fit behind the dashboard of a wide range of automobile sizes. The low cost and modularity of the split exit pupil HUD architecture enabled by the QPI enables a modular HUD system that can be tailored to fit the volumetric constraints of a wide range of automobiles. The benefits of the split exit pupil HUD system disclosed herein will become more apparent from the detailed description provided herein within the context of the embodiments described in the following paragraphs.

Figures 1, 2:
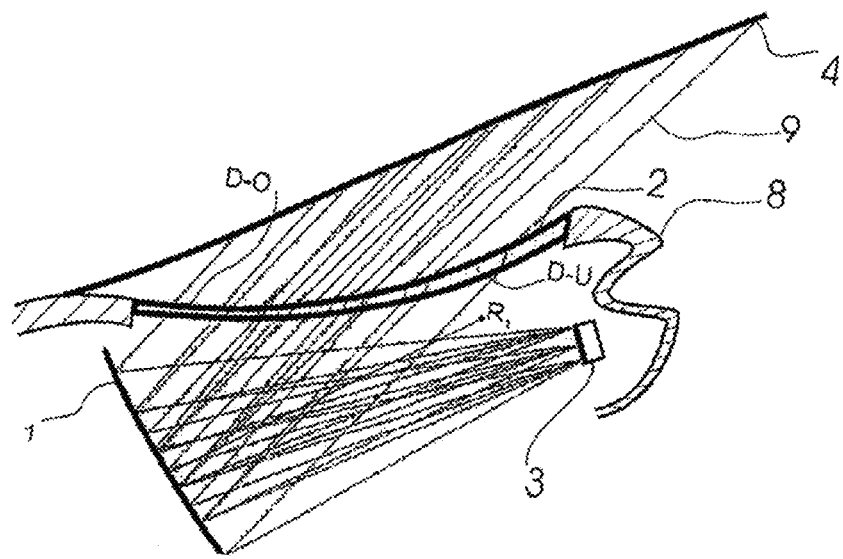

FIGS. 2-1 and 2-2 illustrate a preferred embodiment of the modular HUD (MHUD) system 200 of this invention. As illustrated in FIG. 2-1 and FIG. 2-2, the preferred embodiment of the MHUD system 200 of the invention is comprised of a refractive cover lens 240 and the MHUD collimation assembly 205 which in turn is comprised of a multiplicity of the single collimation module 235 assembled together to form the MHUD collimation assembly 205 whereby each single collimation module 235 is comprised of a single imager 210 (or QPI device) with an associated lens 220 and a single concave mirror segment 230. As illustrated in FIG. 2-1, the image emitted from each single QPI device 210 with associated lens 220 is reflected and collimated by its associated concave mirror segment 230, then combined by the refractive cover lens 240 and partially reflected off the windshield 270 to form the virtual image 260 which is viewable within the eye-box segments 250 located at the nominal position of the vehicle's driver. As illustrated in FIG. 2-1, each of the single collimation modules 235 of the MHUD collimation assembly 205 together with refractive cover lens 240 is disposed to form the virtual image 260, at the same location from the vehicle windshield 270, but each at a different eye-box segment 255, such that the multiplicity of single collimation modules 235 of the MHUD collimation assembly 205 collectively form the combined eye-box 250 of the MHUD system 200. Accordingly, the overall size of the MHUD system 200 eye-box 255 can be tailored by selecting the appropriate number of the single collimation modules 235 comprising the MHUD collimation assembly 205. This split exit pupil design method of the MHUD system 200 of this invention is further explained in more detail in the following paragraphs.

In the preferred embodiment of MHUD system 200 of this invention, the MHUD collimation assembly 205 is comprised of a multiplicity of the single collimation modules 235 assembled together to form the MHUD collimation assembly 205 whereby each single collimation module 235 is comprised of a single QPI device 210 with associated optics 220 and a single concave mirror segment 230. A detailed description of the design method of the MHUD collimation assembly 205 of the MHUD system 200 of this invention and its constituent collimation module is described in more detail in the following paragraph preceded by an explanation of certain of the pertinent advantages and related design parameter tradeoffs of MHUD system 200 of this invention.

MHUD System 200 Optical Design Parameters Tradeoffs—

Figures 1, 2, 3:
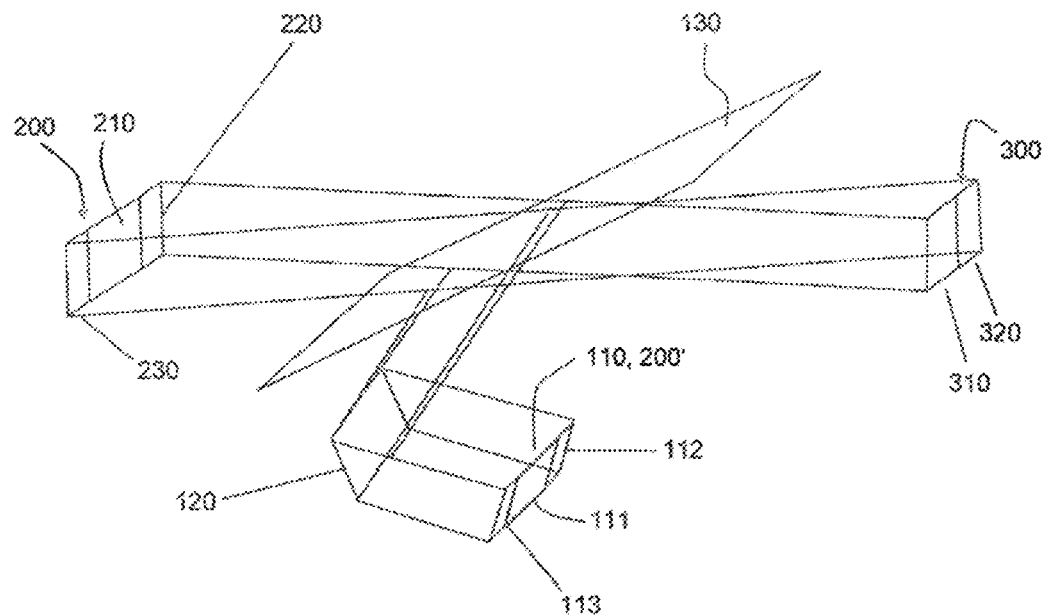

In order to appreciate the advantages of the MHUD system 200 of this invention, it is useful to explain the underlying design tradeoffs of typical HUD systems and the relationships between their pertinent design parameters. The image generated by a HUD system is typically superimposed on the natural scene to permit the viewer operating the vehicle to be visually aware of vehicle operating parameters and to provide critical information, such as navigation for example, without requiring the driver to take his or her sight and attention away from the road or the external surroundings of the vehicle. Important parameters to consider in the design of a HUD system include: the target size of the eye-box, the desired field of view (FOV), the imager size, the image resolution and system volumetric constraints. The relationships among these design parameters and constraints are illustrated in FIG. 3. From FIG. 3, it is seen the HUD system volume is influenced by the optical complexity and effective focal length (EFL). On one hand, the more complex an optical system is, the greater number of elements are needed and the greater in volume the system tends to be. On the other hand, the longer the EFL, the bigger the system tends to be. The EFL is determined in part by the Field of View (FOV) and the imager size. For the same FOV, a bigger imager size will make the EFL larger and hence a bigger HUD volume. The optical complexity is in turn influenced by HUD F/# and required image resolution. The HUD F/# is in turn influenced by the EFL and HUD eye-box size.

How the Modular HUD (MHUD) of this Invention Realizes a Reduced Volume—

Referring again to FIG. 3, a reduction of MHUD system 200 imager 210 size leads to a smaller effective focal length (EFL), which is the characteristic optical track length of the system and generally contributes to a reduction of system volume. However, if the eye-box size is maintained, the reduction of imager size will lead to a lower system F/# accompanied by an increase of optical complexity. This generally results in a larger system volume. In reference to the MHUD system 200 in FIGS. 2-1 and 2-2, the size of the eye-box 255 for each single collimation module 235 is scaled along with the imager 210 size to avoid the increase of optical complexity. This leads to the scaling of the volume of each of the single collimation modules 235 by the imager 210 size ratio. A multiplicity of single collimation modules 235 may be combined to form an MHUD collimation assembly 205 that provides an arbitrary sized eye-box 250. This novel multi segmented eye-box design concept of the MHUD system 200 of this invention is realized by splitting the exit pupil of the system formed at the viewer's eye-box into the multiple segments, each corresponding to one of the eye-box segments 255 comprising the overall eye-box 250 of the MHUD system 200 of this invention. This split exit pupil design method allows the MHUD system 200 of this invention to achieve a smaller overall volumetric aspects than prior art HUD systems providing the same size eye-box. This desirably leads to a reduction in the overall HUD volume and cost. Other advantages of split exit pupil design method of the MHUD system 200 of this invention are described in the following discussion.

The prior art non pupil imaging HUD systems that use a single mirror reflector of U.S. Patent Application Publication No. 2006/0209419 A1 incorporate a long EFL to reduce its optical complexity. Besides the undesirably large size of the mirror itself, the size of the image source must also be proportionally large, which dictates the use of either a large size imager, such as an LCD panel, or forming a large size intermediate image that is projected on a diffusive screen, which adds even more volume necessary for incorporating the projector imager and its associated projection optics. As explained in the foregoing discussion, the MHUD system 200 of this invention achieves a substantially smaller volumetric aspect than prior art HUD systems that use a single concave mirror as the main reflector by using the MHUD collimation assembly 205 that is comprised of the multiple single collimation modules 235, each using a smaller size imager size and a single smaller size mirror 230 that are assembled together to form the overall reflector of the MHUD collimation assembly 205 which is much smaller in size and achieves a much smaller optical track length. Collectively achieving smaller mirror size and smaller optical track length beneficially results in the substantially smaller volume MHUD system 200 of this invention.

Figures 1, 2, 3, 4:
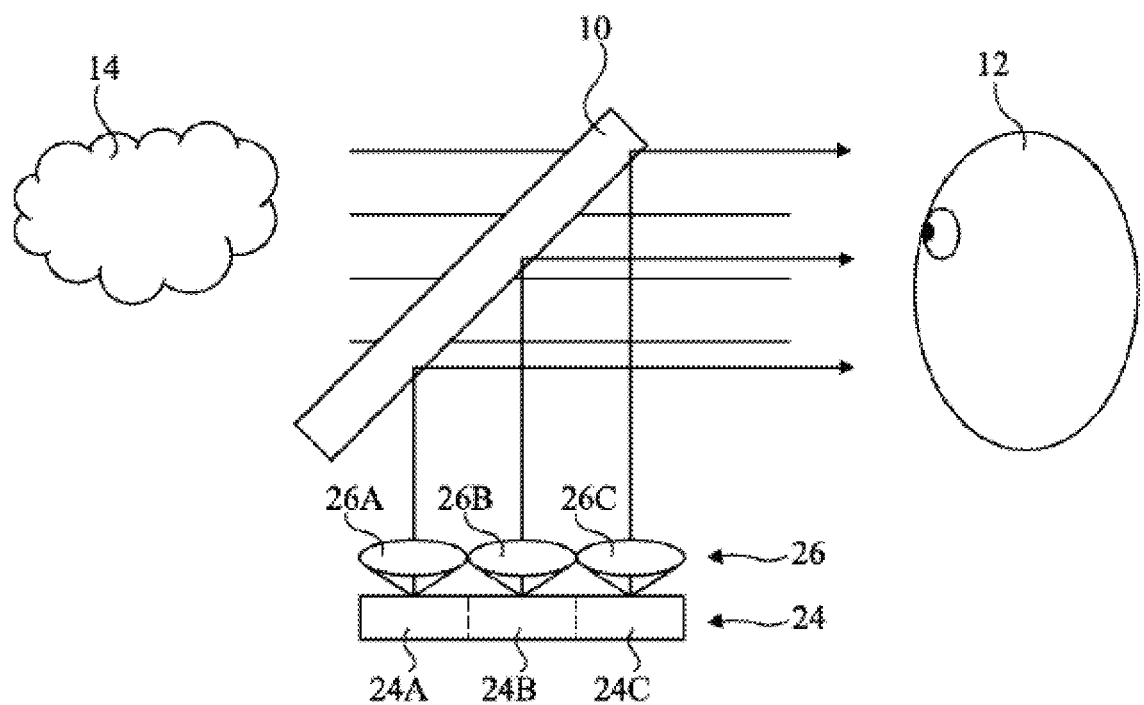
Figures 1, 2:
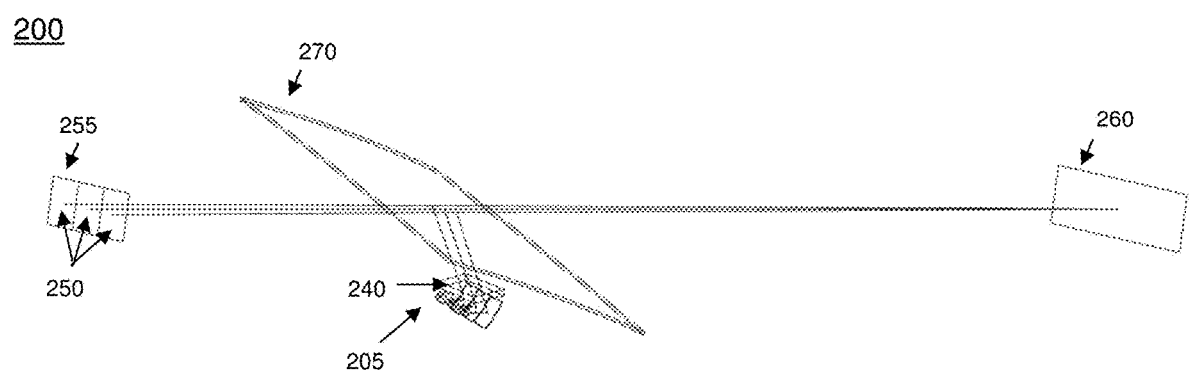
Figure 2:
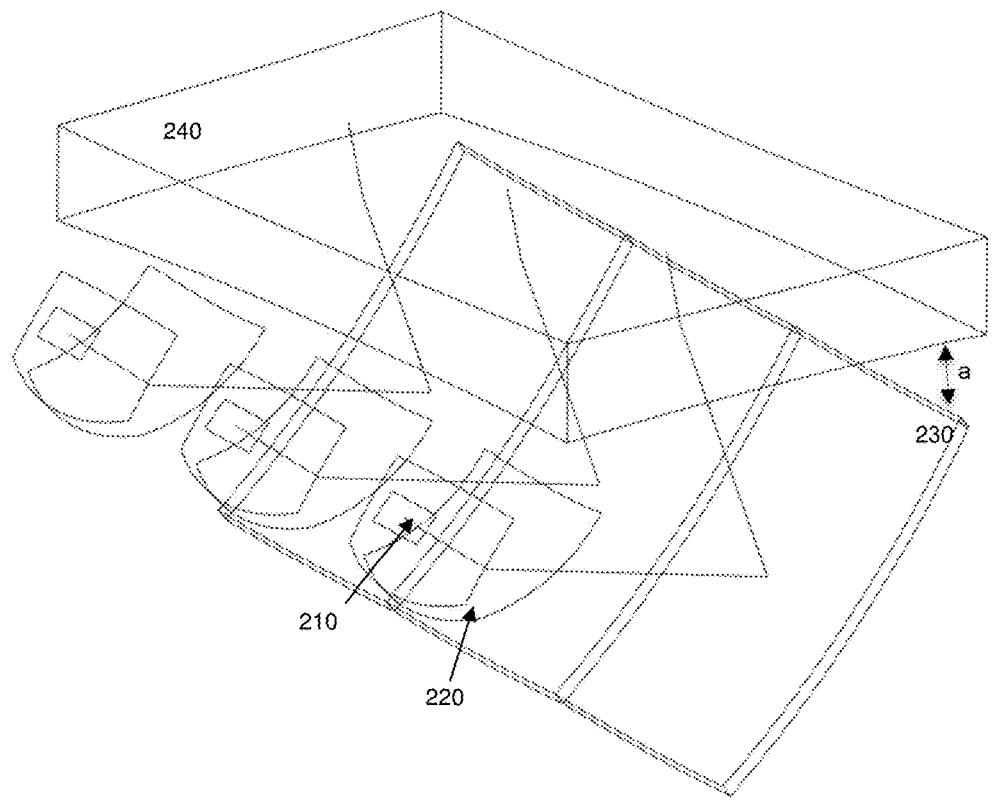
Figure 3:
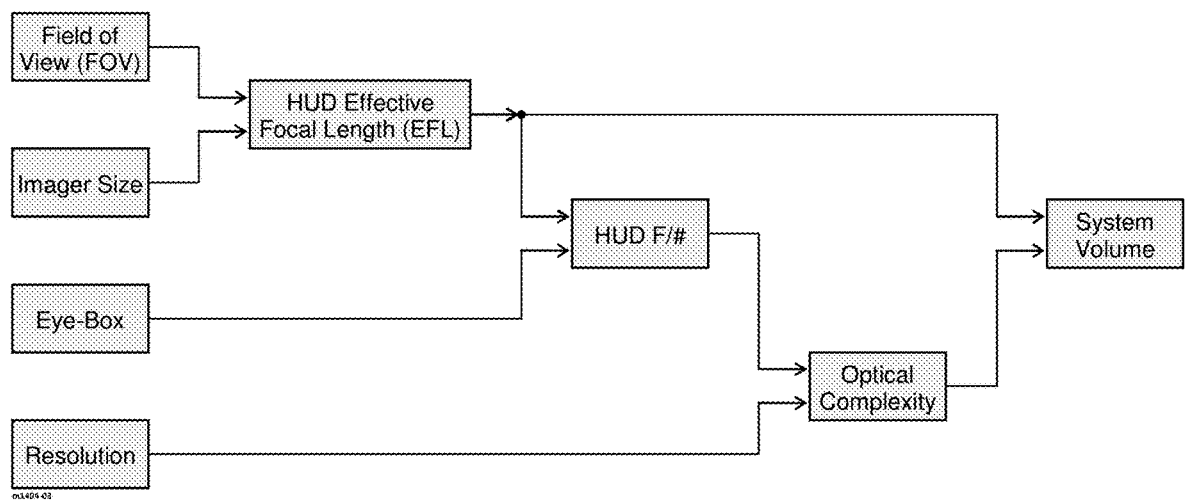
Figure 4:
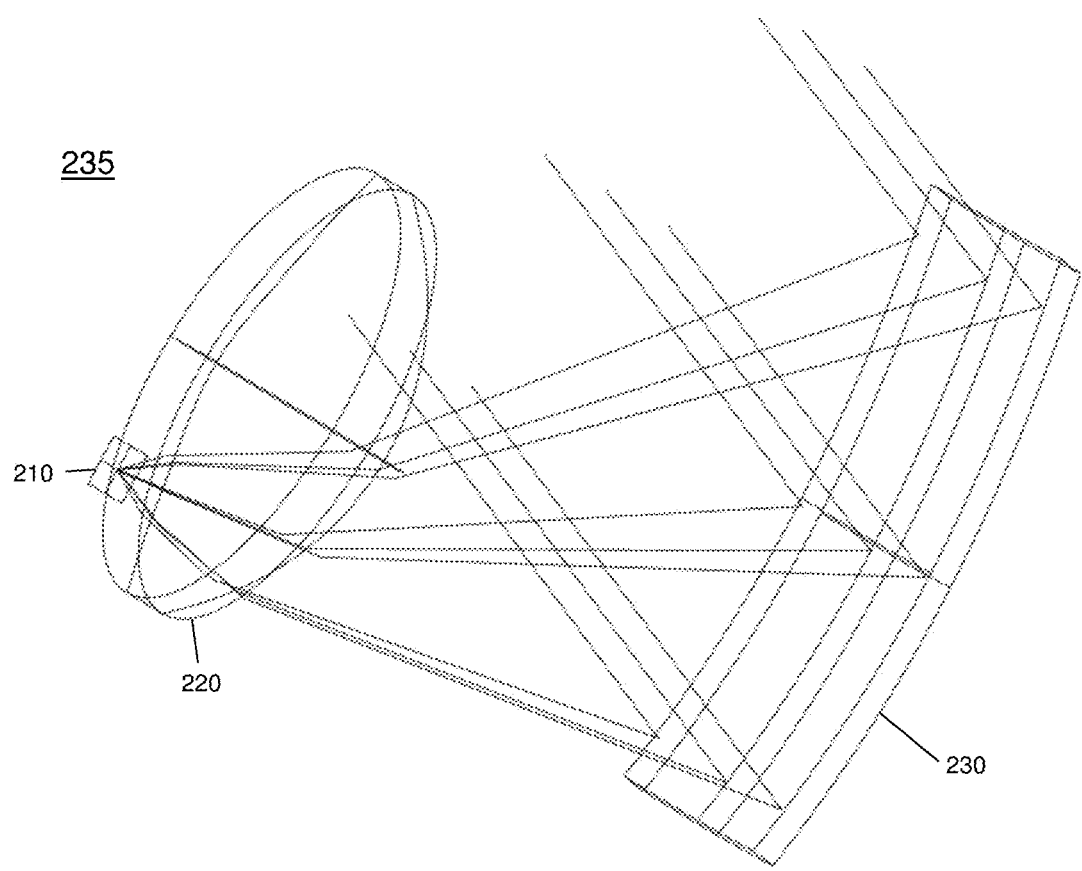

The design of the MHUD system 200 of this invention works by dividing the large aperture beam that is typically generated by a single large mirror into a predetermined number of (in the illustrated embodiment, three) equallysized collimated sub-beams which are then combined by refractive cover lens 240 to form a common virtual image. Each sub-beam is generated by the optical sub-system of the single collimation module 235. As a result, the focal length (EFL) (or optical track length) is reduced and consequently the physical volumetric envelope of the system are reduced. FIG. 4 illustrates the optical design aspects and a ray trace diagram of the single collimation module 235 comprising the MHUD collimation assembly 205. As illustrated in FIG. 4, the single collimation module 235 is comprised of one QPI device 210 together with its associated optics 220 and the concave reflective mirror segment 230. Although in the embodiment illustrated in FIG. 4, the optics 220 associated with the QPI device 210 are shown as a separate lens optical element, in an alternate embodiment of this invention, the QPI-associated optics 220 may be mounted directly on top of the emissive surface of the QPI device 210 to make the QPI and its associated optics into the QPI device assembly 225. As illustrated in FIG. 4, each of the single collimation modules 235 collimates the image generated by its corresponding QPI (or imager) 210 to form one segment 255 of the eye-box 250. To lower the cost of single collimation module 235, lens 220 may be a rotational symmetrical aspherical plastic lens while mirror 230 may be an off-axis segment of a rotationally symmetrical aspherical mirror. The effective aperture of lens 220 may also be an off-axis segment of the rotationally symmetrical lens shown in FIG. 4. Hence the volume of a single collimation module 235 is actually smaller. The optical aberrations in the single collimation module 235 may be controlled by a designed offsetting and tilting of the lens 220 and the mirror 230 within a symmetry plane whose normal vector coincides with the stacking-up direction of single collimation module 235 in FIG. 2-2. The QPI device 210 is also tilted within this same symmetry plane to reduce aberrations in the single collimation module 235. As a result, the single collimation module 235 achieves good optical performance in both wave front and distortion correction without resorting to a freeform or asymmetrical optical surface which is difficult to fabricate and is cost intensive but quite common in prior art HUD designs. Further, the existence of a single symmetry plane within the single collimation module 235 simplifies the mechanical mounting design while increasing its manufacturability by reducing alignment challenges. The refractive cover lens 240 may be a rotationally symmetrical plastic lens with a trapezoidal aperture. It has at least three major functions: 1) sealing the single collimation modules 235 from the outside environment; 2) combining the collimated information from single collimation modules 235 to form a common virtual image which, after refection on the windshield 270, is viewable from eye-box 250 as appearing at a certain plane 260 in front of the windshield 270; 3) balancing aberrations introduced at windshield 270 by a designed tilt of refractive cover lens 240 such that the ray running down the optical axis is defined by the center of eye-box 250 and the virtual image 260 enters the refractive cover lens 240 at its front surface pole in a preferred angle and in a preferred azimuth plane. In particular, a driver does not look out the center of the windshield, but rather out from the driver's side. As a result, while a windshield is fairly straight from the hood to the roof, it curves around in the other axis, so a light at the driver's side incident to the windshield in a vertical plane parallel to the vehicle sides will be partially reflected in an angle toward the opposite side of the vehicle, not directly back to the collective eye-box or eye-plane 250. By the designed tilt, the local angle of the windshield described is compensated for, so that the reflection to the overlapping eye-box segments is straight into the eye-box segments, not angled as described above. The tilt is schematically illustrated in FIG. 2-2, where the separation "a" between the refractive lens and the columniation modules 235 can be seen as being substantially greater than the corresponding separation at the other end of the refractive lens. In prior art HUDs, the aberration of windshield 270 is usually corrected by an asymmetrical component such as a cylindrical or freeform lens which is more cost intensive and difficult to align properly. An advantage of the device and method of this invention is the complete decoupling in the design and function of the single collimation module 235, the MHUD collimation assembly 205 and the refractive cover lens 240. The single collimation module 235 is designed to perform collimation which can be tested, aligned and calibrated independently. A number of calibrated single collimation modules 235 are stacked up to form the MHUD collimation assembly 205 whose mechanism ensures the same angular pointing of the constituent single collimation module 235. The residual error in the angular pointing of the constituent single collimation module 235 in the MHUD collimation assembly 205 can be calibrated out with digital correction. The refractive cover lens 240 is essentially designed as a Fourier Transforming lens with rotationally symmetrical surfaces which can be tested independently. Upon alignment of refractive cover lens 240 with respect to the windshield 270, a guiding laser beam traveling in the direction opposite to that of the chief ray can be used. The refractive cover lens 240 may be adjusted with reference to the reflected laser beams on its surfaces. Once refractive cover lens 240 is positioned and oriented correctly, the MHUD collimation assembly 205 can be adjusted angularly relative to the refractive cover lens 240 with a suitable mechanism or through an additional global digital warping applied to all constituent QPI devices 210. Most prior art HUDs with windshield correction are designed as coupled systems which does not allow independent testing of the HUD. It is obvious that the decoupling approach of MHUD 200 facilitates its testing, alignment and installation in a vehicle.

In another embodiment of this invention, the imagers 210 of the MHUD collimation assembly 205 have a resolution that is higher than what the human visual system (HVS) can resolve with the added resolution being dedicated to a digital image warping pre-compensation of the residual optical distortion caused by the aberrations. In a typical HUD viewing experience, the virtual image is formed at a distance of approximately 2.3 m. The lateral acuity of the HVS is approximately 582 micro-radians. At that distance the HVS can resolve roughly 2300×0.000582=1.33 mm pixel, which is equivalent to approximately 180×61 pixel resolution for a virtual image 260 having a 10" diagonal dimension. The QPI imagers 210 used in the MHUD collimation assembly 205 provide a much higher resolution than this limit, for example 640×360 resolution or even 1280×720 with the same size optical aperture. The QPI imagers 210 providing a higher resolution with the same size optical aperture enable the use of mirrors 230 with the same size optical aperture, thus maintaining the volumetric advantage of the MHUD collimation assembly 205. The added resolution of QPI imagers 210 permits the use of digital image warping pre-compensation that virtually eliminates the optical distortion while maintaining maximum achievable resolution at the virtual image 260 and with the same volumetric advantages.

Each single collimation module 235 comprising the MHUD collimation assembly 205 is preferably substantially identical. This lowers the system cost by the leverage of big volume in mass production. If a larger eye-box 250 is desired as dictated by the application, additional single collimation modules 235 can be added to the MHUD collimation assembly 205 with the refractive cover lens 240 being replaced by one with a larger aperture. This makes the MHUD 200 very easy to scale up or down to meet specific application requirements.

Figure 5:
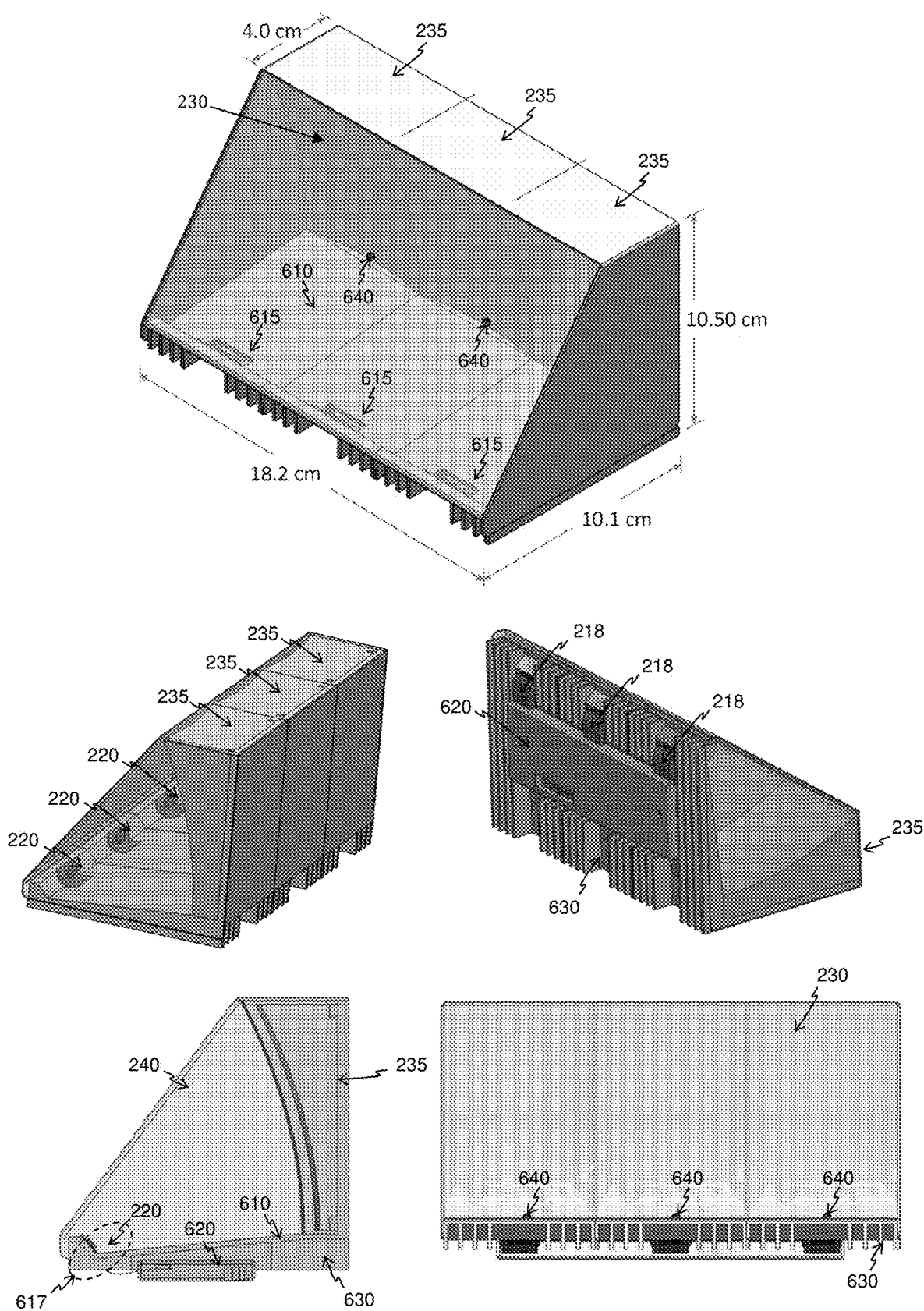
FIG. 5 Illustrates a multi-view perspective of the MHUD assembly design example of the MHUD system of this invention.

FIG. 5 illustrates a multi-view perspective of a preferred embodiment of MHUD collimation assembly 205. As illustrated in FIG. 5, the MHUD collimation assembly 205 is comprised of, in the illustrated embodiment, three reflective concave mirrors 230 assembled together within the enclosure 600. The three mirrors 230 may be either fabricated separately then fit together within the enclosure 600 or may be fabricated as a single part then fit within the enclosure 600. The three mirror segments 230, whether assembled separately or as a single optical part, may be fabricated by embossing optical-grade plastic with any optical surface being subsequently coated with a thin layer of a reflective coating, such as a metal coating, using known sputter techniques or using a dielectric coating deposited with thin film deposition techniques. As illustrated in the side view perspective of FIG. 5, the top edge 617 of each of the back sidewall sections 615 is angled toward the mirror segment 230 to allow the imagers 210, which may be mounted on the angled edge surface 617 of the back sidewall sections 615, to be aligned with the optical axis of their respective mirror segments 230.

As illustrated in the rear side view perspective of FIG. 5, the back sidewall sections 610 may be assembled together on one side of the back plate 630 with the interface electronics element (e.g., printed circuit board) 620 of the MHUD collimation assembly 205 mounted on opposite side of the back plate 630. In addition, the back plate 630 may also incorporate thermal cooling fins to dissipate the heat generated by the imagers 210 and the interface electronics element (printed circuit board) 620 of the MHUD collimation assembly 205. As illustrated in the rear side view perspective of FIG. 5, each of the imagers 210 would typically be mounted on a flexible electrical board 618 that connects the imagers 210 to the control and interface electronics board 620.

As illustrated in the rear side view perspective of FIG. 5, the centers of the interface edges of the each pair of the mirrors 230 and the back sidewall sections 610 incorporate the photo detectors (PD) 640, typically photo-diodes, each positioned and oriented to detect the light emitted from the imagers 210 onto their respective mirror 230. The outputs of the photo detectors (PD) 640 are connected to the interface electronics board 620 of the MHUD collimation assembly 205 and are used as inputs to the uniformity control loop (described in the discussion below), implemented within the hardware and software design elements of the interface electronics element (printed circuit board) 620. Also provided to the interface electronics element 620 of the MHUD collimation assembly 205 as an input, is the output of the ambient light photo detector sensor 650 which is typically an integral part of most vehicles' dashboard brightness control.

Figure 6:
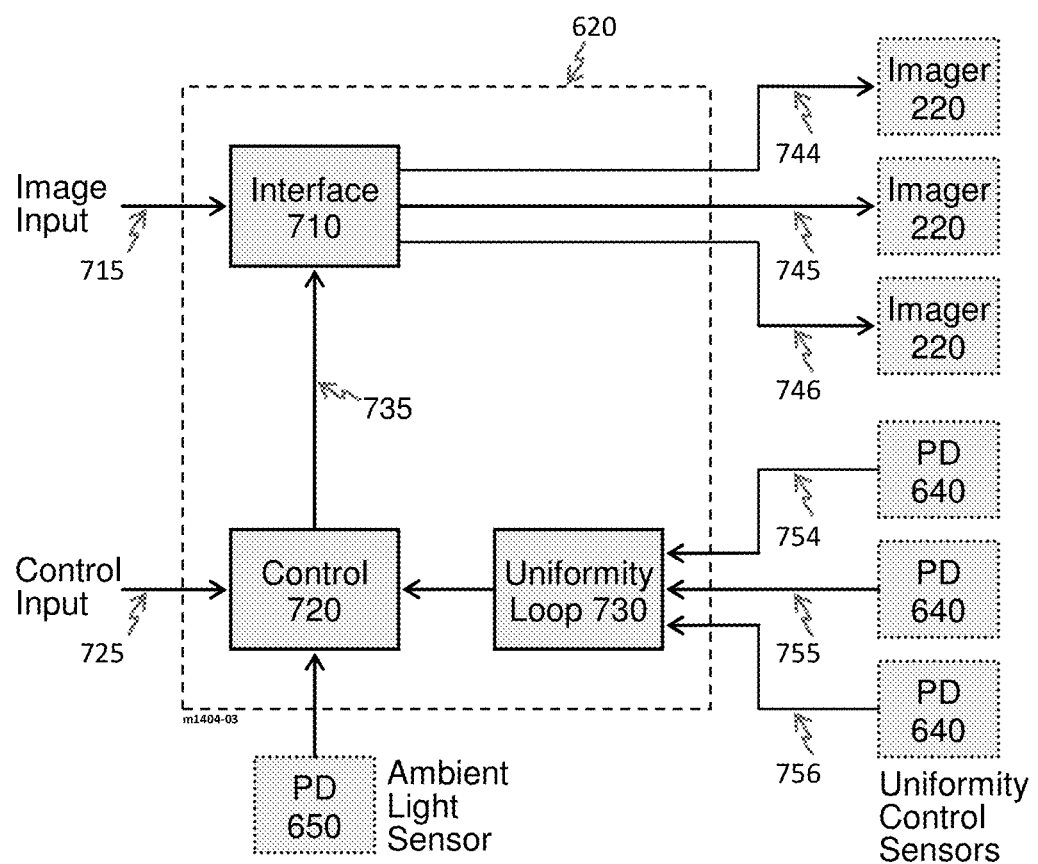
FIG. 6 Illustrates a functional block diagram of the interface and control electronics design element (board) of the MHUD system of this invention.

The interface electronics element 620 of the MHUD collimation assembly 205 incorporates the hardware and software design functional elements illustrated in the block diagram of FIG. 6, which include: the MHUD interface function 710, the control function 720 and the uniformity loop 730. The MHUD interface function 710 of the interface electronics element 620 of the MHUD collimation assembly 205, which is typically implemented in a combination of hardware and software, receives the image input 715 from the vehicle's Driver Assistance System (DAS) and incorporates into it (the image) the color and brightness corrections 735 provided by the control function 720 then provides image inputs 744, 745 and 746 to the imagers 210 of the MHUD collimation assembly 205. Although the same image input 715 data would be provided to the (three) imagers 210 of the MHUD collimation assembly 205, the interface function 710 incorporates each imager's 210 specific color and brightness corrections in their respective inputs 744, 745 and 746 based on the color and brightness corrections 735 received from the control function 720.

In order to ensure color and brightness uniformity across the multiple segments 255 of the eye-box 250, the uniformity loop function 730 of the interface electronics element 620 receives the input signals 754, 755 and 756 from the photo detectors 640 of each of the sub-assemblies of the MHUD collimation assembly 205, computes the color and brightness associated with each of the sub-assemblies 235 of the MHUD collimation assembly 205, then calculates the color and brightness corrections required to make the color and brightness more uniform across the multiple segments 255 of the eye-box 250. This may be accomplished with the aid of an initial calibration look-up table that would be performed and stored in memory of the interface electronics element 620 when the MHUD collimation assembly 205 is originally assembled. The color and brightness corrections calculated by the uniformity loop function 730 are then provided to the control function 720 which combines these corrections with inputs received from the ambient light detector and the external color and brightness adjustment input command 725 to generate the color and brightness corrections 735 which are then incorporated into the image data by the interface function 710 before the corrected image data is provided as the inputs 744, 745 and 746 to the imagers 210.

As explained previously in the description of one embodiment of the MHUD system 200 that uses imagers 210 with higher resolution than the maximum HVS resolvable resolution at the virtual image 260, the MHUD interface function 710 of the MHUD collimation assembly 205 of the MHUD system 200 of that embodiment may also incorporate a multiplicity of look up tables each incorporating data that identifies the digital image warping parameters required to pre-compensate for the residual optical distortion of each of the single collimation module 235. These parameters are used by the MHUD interface function 710 to warp the digital image input of each of the imagers 210 in such a way that the image data input to each of the imagers 210 pre-compensates for their corresponding single collimation module 235 residual distortion. The digital image warping parameters incorporated in the look up tables of the MHUD interface function 710 may be preliminarily generated from the optical design simulation of the MHUD collimation assembly 205 and then augmented with optical test data that is based on measurements of the residual optical distortion of each MHUD module 235 after the digital image warping pre-compensation is applied by the MHUD interface function 710. The resultant digitally warped image data is then combined with the image correction data 735 provided by the control function 720 then the color and brightness corrected and distortion pre-compensated image data are then provided as the inputs 744, 745 and 746 to the imagers 210 of the MHUD collimation assembly 205. With this design method of the MHUD system 200, the residual optical distortion caused by the single collimation module 235 is substantially reduced or eliminated altogether, thus making it possible to realize a distortion-free MHUD system 200.

As illustrated in perspective view of FIG. 5, the top side of the MHUD collimation assembly 205 is the refractive cover lens 240, which would function as the optical interface window of the MHUD collimation assembly 205 at the top surface of the vehicle dashboard and would also function as a filter that would attenuate the sunlight infrared emission to prevent sunlight thermal loading at the imagers 210. Alternatively, mirror 230 can be coated as a cold mirror (transmitting long wavelength) to reduce sun load at the imagers 210.

The design method of the MHUD collimation assembly 205 leverages the characteristics of the human visual system (HVS) to simplify the design implementation and assembly tolerances of the MHUD collimation assembly 205. First, the eye pupil being approximately 2-4 mm in diameter would allow indiscernible small gap between MHUD collimation assembly 205 mirror segments 230 that can reach approximately 1 mm in width. Further, digital image content shifting on micro-display 210 will have the effect of changing angular orientation of collimated information from each single collimation module 235 which can be used to offset mechanical angular pointing error of each single collimation module 235. These tilt and gap allowances set a relaxed mechanical alignment tolerance requirement for the MHUD collimation assembly 205 and therefore enable a very cost effective manufacturing and assembly approach for the MHUD collimation assembly 205.

Figure 7:
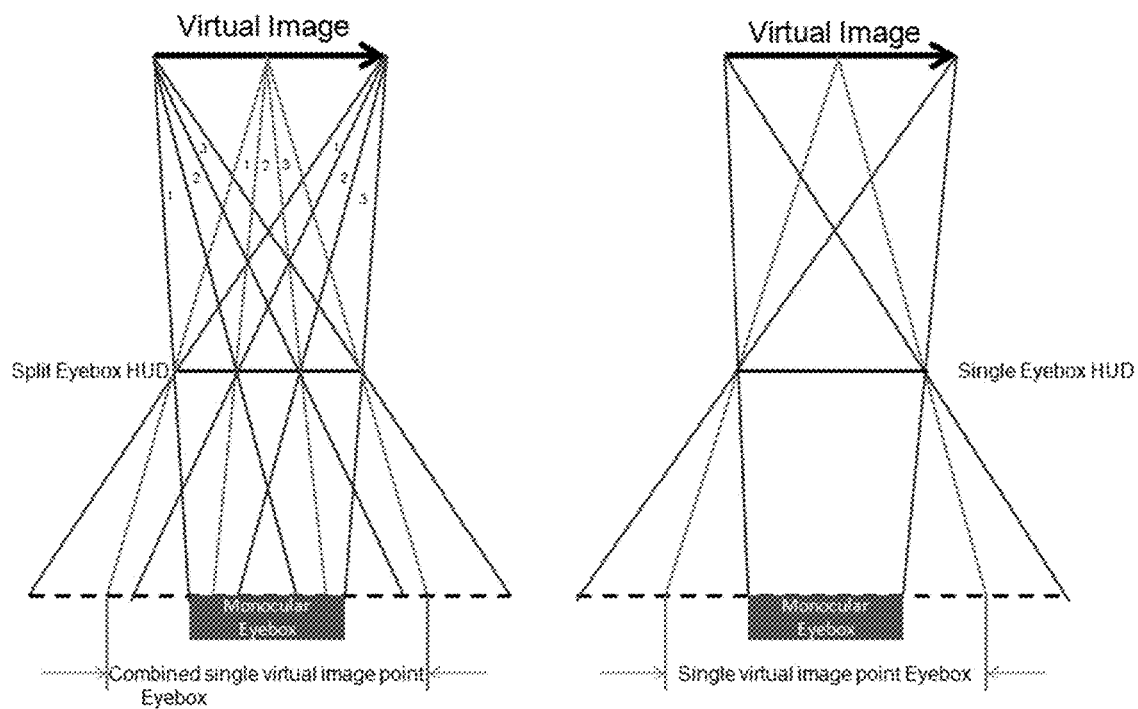
FIG. 7 Illustrates the novel split eye-box design method of the MHUD system 200 of this invention.

FIG. 7 illustrates the split eye-box design method of the MHUD system 200 of this invention in contrast to prior art non-pupil-imaging single eye box HUD. In the split eye box HUD in FIG. 7, three single collimation modules 235 form the MHUD collimation assembly 205. Each virtual image point is presented to the viewer through all the single modules 235 with the light cone from respective modules labeled by 1, 2 or 3 in FIG. 7. At the eye-plane, light cones from the same virtual image point but through different single modules 235 stacked up to form the combined single virtual image point eye-box 250 with eye-box components 255 corresponding to light cones from single module 235. Due to the separation between the MHUD collimation assembly 205 and eye-plane 250, the combined single virtual image point eye-box shifts within the eye-plane as the single virtual image point changes over the virtual image object. The monocular eye-box of MHUD assembly 200 is defined as the overlap of all single virtual image point eye-boxes over which the whole virtual image can be seen with one eye. On the right side of FIG. 7, a non-pupil imaging single eye-box HUD is shown. Each point on the virtual image is presented to the viewer through the full aperture of the single eye-box HUD and the single virtual image point eye-box also shifts within the eye-plane as the single virtual image point changes over the virtual image object. The monocular eye-box is again defined by the overlap of all single virtual image point eye-boxes. As illustrated in FIG. 7, although the arrow object is partially-visible through a single collimation module 235 for any eye location within the monocular eye-box, it would become fully visible by combining information reaching the same eye location through other single modules 235. As the eye location moves out of the monocular eye-box, the arrow object will be gradually vignetted. The viewing experience is the same for the non-pupil imaging single eye-box HUD whose optical aperture is much larger than that of a single module 235 of MHUD collimation assembly 205.

As illustrated in FIG. 7, in eye-box areas extending beyond the right and left sides of the eye-box 250 of the MHUD system 200, the arrow object of the virtual image would gradually vignette as the viewer's head moves into these regions; respectively. With the design approach of the MHUD system 200, the addition of an MHUD module 235 to either the right or left sides of the MHUD collimation assembly 205, illustrated in FIG. 5, would extend the lateral width of the eye-box 250 of the MHUD system 200 to the right or left sides; respectively, where the arrow object of the virtual image 260 would become fully visible. Similar effect of extending the height of the eye-box 250 would occur in the orthogonal direction when another row of MHUD modules 235 is added to the MHUD collimation assembly 205. Thus with this modular design method for the MHUD system 200 of this invention, any arbitrary size eye-box 250 with any design selected width and height dimensions can be realized by adding more of the MHUD modules 235 into the MHUD assembly 205.

In essence, the split exit pupil modular design method of the MHUD system 200 of this invention enables the use of a multiplicity of QPI imagers 210 and mirrors 230 each with relatively smaller apertures and each achieving a short optical track length to replace the much longer optical length of the larger image source and the single mirror used in prior art HUD systems. Thus the smaller aperture of imagers 210 and mirrors 230 of the MHUD collimation modules 205 would collectively enable a substantially smaller volumetric aspect than can be achieved by prior art HUD systems that use larger single image sources and single mirrors to achieve the same size eye-box. Furthermore, the size of the achieved eye-box 250 of the MHUD system 200 can be tailored by using the appropriate or predetermined number of MHUD collimation modules 235 as basic design elements. Conversely the volumetric aspects of the MHUD system 200 can be made to match the volume available in the vehicle dashboard area while achieving a larger size eye-box 250 than can be achieved by a prior art HUD system that can fit in the same available volume.

Figure 8:
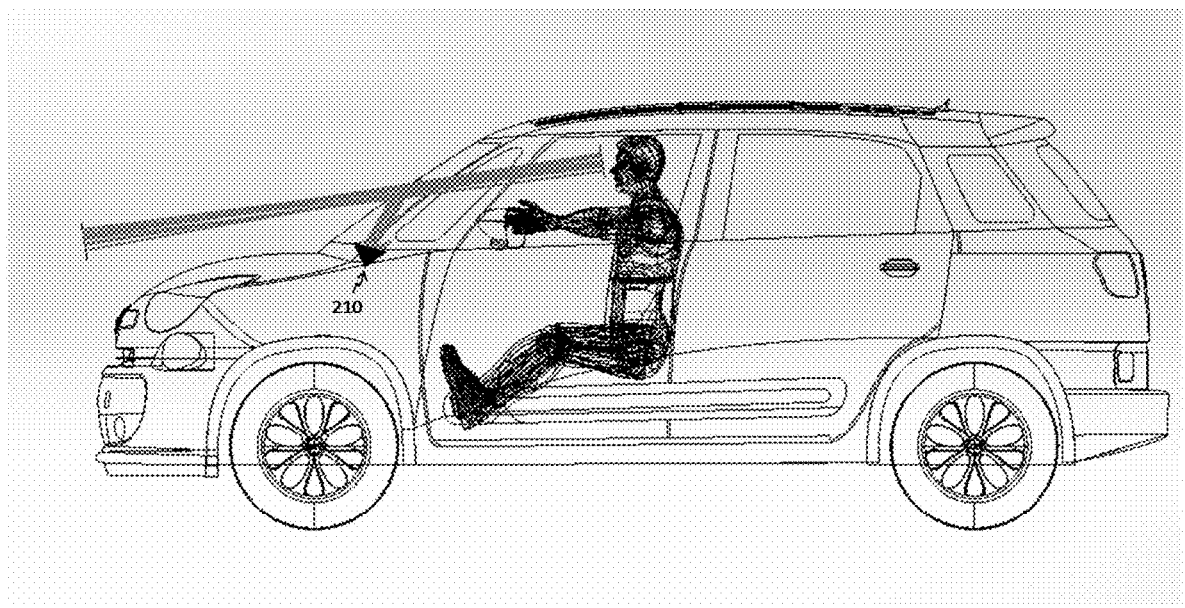
FIG. 8 illustrates the volume of the MHUD assembly design example illustrated in FIG. 5 installed in the dashboard of a sub-compact automobile.

FIG. 8 illustrates the MHUD collimation assembly 205 design example illustrated in FIG. 5 installed in the dashboard of a sub-compact automobile. As illustrated in FIG. 8, the volumetrically efficient design of the MHUD system 200 of this invention enables the addition of HUD capabilities in automobiles with very constrained dashboard volume in which prior art HUD systems would simply not fit.

Figure 9:
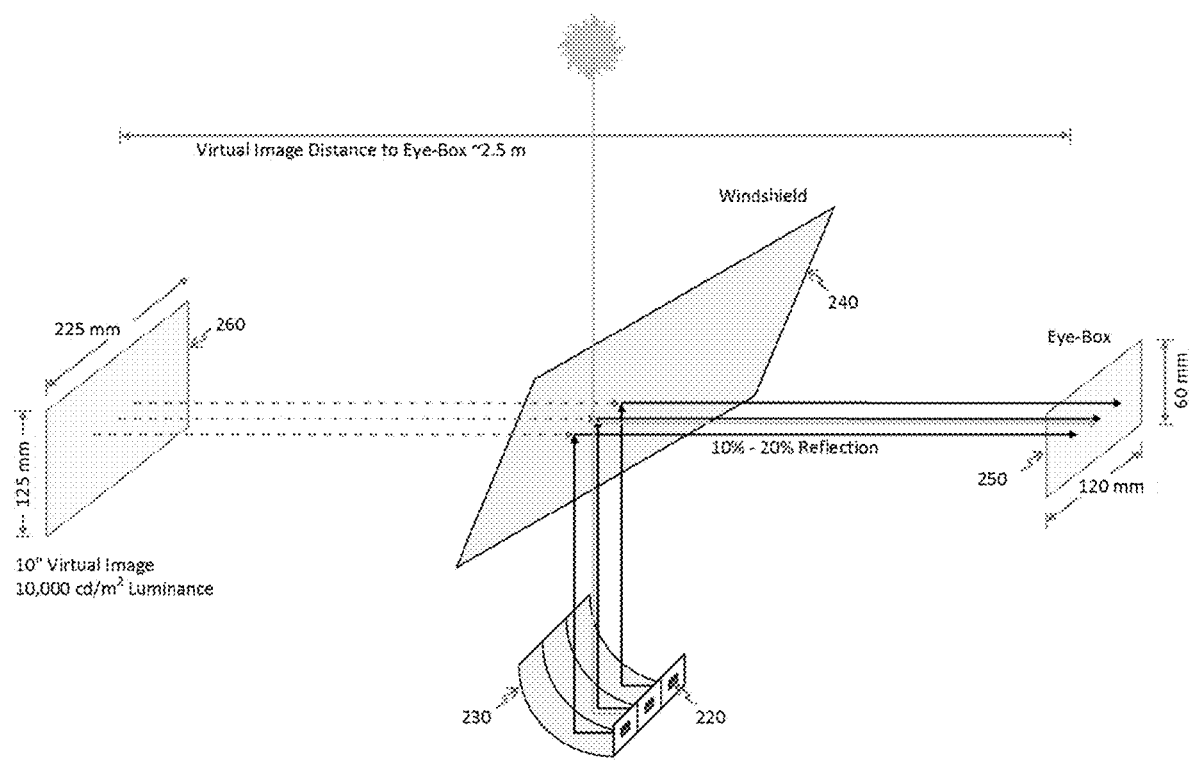
FIG. 9 Illustrates a ray path of the MHUD system 200 of this invention including sunlight loading.

FIG. 9 illustrates the ray path of the MHUD system 200. As illustrated in FIG. 9, and previously explained and illustrated in FIGS. 2-1 and 2-2, the illustrated three QPI imagers 210 comprising the MHUD collimation assembly 205 each generate the same virtual image 260 of 242×82 mm at the same resolution (for example 640×360 pixels) and at the same location, after being reflected by the windshield 270, would be viewable from the entire eye-box 250 of the earlier described design example. FIG. 9 illustrates a design to generate a 10,000 cd/m2 of brightness at the virtual image 260. With a typical windshield reflectivity of approximately 20%, each of the three QPI imagers 210 would generate about 50,000 cd/m2 of brightness. Conservatively estimated, the three QPI imagers 210 plus the interface electronics element 620 of the MHUD collimation assembly 205 would collectively consume approximately 4 W to generate 50,000 cd/m2 of brightness, which is approximately 50% of the power consumption of a prior art HUD system.

FIG. 9 also illustrates the ray path of the MHUD system 200 with the sunlight loading included. As illustrated in FIG. 9, the reversed optical path of the sunlight that strikes the windshield of the vehicle and enters the MHUD collimation assembly 205 would reach the eye-box 250 area possibly causing a glare in the virtual image 260. In the design of the MHUD system 200 of this invention, the amount of sunlight rays that could reach the eye-box 250 would be much less in comparison to prior art HUD systems. First, in assuming that the windshield 270 optical transmission is 80%, the light rays from the sun will be attenuated by the windshield 270 to at most 80% of its brightness. Second, the sun rays transmitted through the windshield 270 and reflected by one of the mirrors 230 towards its corresponding imager 210 would be further attenuated by the anti-reflective (AR) coating on the optical aperture of the imager 210 to at most 5% of its brightness before it is reflected back toward the mirrors 230 assembly. Thirdly, this reversed path sunlight would then be further attenuated to at most by 20% of its brightness when it is reflected by windshield 270 towards the eye-box 250. In addition, the QPI imager 210 can be designed tilted to bounce the incoming sun light out of system upon reflection on the imager 210. Assuming 50% sun light can be damped in this way, the sunlight glare reflected from the MHUD collimation assemblies 205 stricken by the sunlight would appear further attenuated by 50% at the virtual image 260. Therefore, based on this path attenuation analysis, the sunlight that would reach the eye-box 250 would be attenuated to at most 0.4% (much less than 1%) of its brightness. With the MHUD system 200 being able to generate more than 10,000 cd/m2 of brightness and 0.4% sunlight glare at the virtual image 260, the MHUD system 200 can tolerate a sunlight brightness of more than 250,000 cd/m2, which is equivalent to a unified glare rating (UGR) (or glare to image intensity ratio) of approximately 28 dB. It is worth mentioning that the refractive cover lens 240 may be infrared absorbing or the mirror 230 be a cold mirror (transmitting long wavelength) to prevent the sun loading heat from being concentrated by the mirror 230 assembly back to the QPI images 210.

Table 1 presents the salient performance characteristics of the MHUD system 200 of this invention illustrating its performance advantages in comparison to prior art HUD systems that use a single larger mirror and a single larger image source.

TABLE 1

Performance Comparison

| Parameter | Prior Art HUD * | QPI-Based MHUD |
|---|---|---|
| Color Reproduction (Ratio of NTSC) | 80% | 140% Programmable |
| Virtual Image Intensity | 6,000 cd/m$^2$ | >10,000 cd/m$^2$ |
| Contrast Ratio | 400:1 | >100,000:1 |
| Power Consumption (Imager + Drive Electronics) | >8 W | <4 W |
| Relative Size (HUD Assembly) | 100% | <30% |

* Prior Art HUD based on using a high brightness LCD panel as image source

As shown in Table 1, the split exit pupil MHUD system of this invention outperforms prior art HUD systems by multiple factors in every performance category. In addition, because of its relaxed manufacturing tolerances and smaller size mirror explained earlier, the MHUD system 200 of this invention is much more cost effective than prior art with comparable eye-box size.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A heads-up display comprising:
a plurality of image sources;
a plurality of collimation modules, each collimation module associated with a respective image source to collimate an image emitted by the respective image source;
a refractive lens disposed to receive collimated images from the plurality of collimation modules, each image for partial reflection off a windshield of a vehicle, to form a virtual image, the virtual images forming a collective image viewable at the same location from the vehicle windshield within a collective eye-box formed by eye-box segments associated with each collimated image, the refractive lens being tilted with respect to the collimation modules to compensate for a local angle of the windshield on a driver's side of a vehicle so that the partial reflection to the overlapping eye-box segments is straight into the collective eye-box.

2. The heads-up display of claim 1 wherein each image source is comprised of an imager and an associated lens.

3. The heads-up display of claim 2, wherein each lens associated with a respective imager is a rotationally symmetrical aspherical plastic lens with an effective aperture being an off-axis segment of the rotationally symmetrical lens.

4. The heads-up display of claim 1 wherein the plurality of image sources and collimation modules are in arrays and wherein the collimation modules are identical.

5. The heads-up display of claim 4, wherein the collimation module plus its corresponding image source has a symmetry plane.

6. The heads-up display of claim 5, wherein each collimation module comprises a concave mirror, and wherein the concave mirror is an off-axis segment of a rotationally symmetrical aspherical mirror.

7. The heads-up display of claim 5, wherein the imager is tilted within the symmetry plane.

8. The heads-up display of claim 1 wherein each collimation module comprises a concave mirror.

9. The heads-up display of claim 1 wherein the refractive lens is a rotationally symmetrical element and is tilted with respect to an optical axis to balance aberrations introduced at a vehicle windshield.

10. The heads-up display according claim 1, wherein the image source array and collimation module array are arranged to form an assembly to ensure that images from each module are pointed in the same direction and to minimize gaps between modules.

11. The heads-up display of claim 1, wherein the refractive lens simultaneously serves as a cover for the collimation module array assembly.

12. The heads-up display of claim 1, wherein photo detectors are disposed within each collimation module near the respective image source to implement a uniformity control loop.

13. The heads-up display of claim 1, wherein the image source has a resolution higher than that at a virtual image, extra pixels at the image source being used in digital pre-warping to ensure a virtual image with small distortion.

14. A heads-up display for a vehicle comprising:
a refractive lens;
a multiplicity of modules, each said module having;
   a solid state emissive pixel array imager; and
   a concave mirror disposed to collimate, magnify and reflect an image generated by the solid state emissive pixel array imager toward a vehicle windshield through the refractive lens to form a virtual image that is viewable within an eye-box segment;
the refractive lens being tilted with respect to the concave mirrors of the modules to compensate for a local angle of the vehicle windshield on a driver's side of the vehicle;
the multiplicity of modules being disposed so that the eye-box segments combine to provide the heads-up display having a collective eye-box that is larger than the eye-box segment of each module, the collective eye-box being located at a nominal head position of a vehicle's driver;
each module being configured and positioned to form the respective virtual image at the same position from the vehicle windshield and each module with its respective eye-box segment being positioned at an exit pupil of the respective module such that adjacent eye-box segments of the multiplicity of modules overlap and combine to form a split exit pupil eye-box, whereby image information presented to the vehicle's driver within the collective eye-box is an angularly multiplexed view of the virtual image extending over a collective angular field of view.

15. A method of forming a heads-up display for a vehicle comprising:
using a multiplicity of modules, and performing in each module, directing an image emitted by a solid state emissive pixel array imager in each module onto a respective concave mirror to collimate, magnify and reflect the image;
mounting the multiplicity of modules with a refractive lens over the multiplicity of modules in a vehicle so that the image from the concave mirror in each module can pass through the refractive lens and reflect from a vehicle windshield toward a vehicle operator's eyes to appear as a respective virtual image at some position in front of the vehicle, the position of the virtual images being the same for all modules; and
causing the solid state emissive pixel array imager in each module to emit the same image at any one time;
wherein the refractive lens is tilted with respect to the concave mirrors of the modules to compensate for a local angle of the vehicle windshield on a driver's side of the vehicle;
whereby a collective eye-box viewable by an operator of the vehicle will be larger than an eye-box segment of any one module;
each module being positioned to form the respective virtual image with the respective eye-box segment positioned at an exit pupil of the respective module such that the eye-box segments of the multiplicity of modules overlap and combine to form a split exit pupil collective eye-box, whereby image information presented to the vehicle's operator within the collective eye-box is an angularly multiplexed view of the virtual image extending over a collective angular field of view, the overlap of the eye-box segments of the multiplicity of modules forms a split exit pupil collective eye-box.

* * * * *